2,754,922

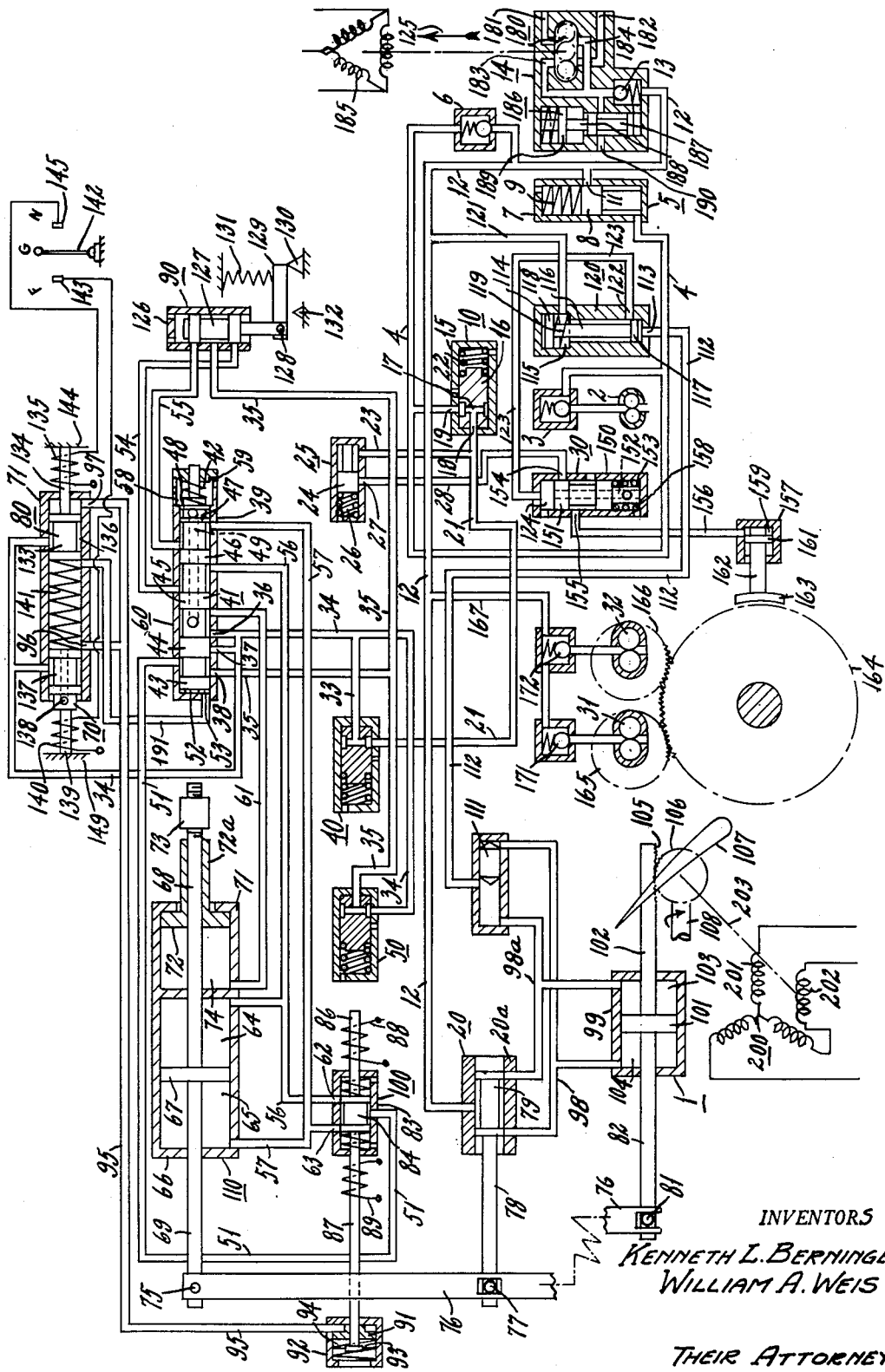

VARIABLE PITCH PROPELLER CONTROL

Kenneth L. Berninger and William A. Weis, Dayton, Ohio, assignors to General Motors Corporation, Detroit, Mich., a corporation of Delaware Application April 24, 1952, Serial No. 284,169

14 Claims. (Cl. 170—160.21)

The present invention relates to variable pitch propellers, and more particularly to a fluid pressure system for controlling the movements of variable pitch propeller blades.

One of our objects is to provide a fluid pressure control system wherein means are provided for effecting different pitch change rates through the application of different pressure potentials. The aforementioned and other objects are accomplished in the present invention by providing a fluid pressure system with means for deriving a plurality of different pressure potentials, and means for selectively applying the particular pressure potential required to accomplish the desired pitch change rate.

Specifically, the fluid pressure system includes a continuously driven system pump, a pair of selectively operable auxiliary pumps, and an electric motor-operated feathering pump. The output of the pump, or pumps which are operating, is supplied to a first minimum pressure valve and a first pressure reducer valve. The minimum pressure valve maintains a predetermined pressure in a high pressure trunk line that is connected to a distributor valve. The pressure in the trunk line is further regulated by a pressure control valve to meet the pressure and flow demands of a blade actuating torque unit. The first pressure reducer valve supplies fluid to a second minimum pressure valve, the output of which controls servo actuated means for operating a clutch mechanism that renders the two auxiliary pumps operative when the system pump is unable to supply the flow and pressure requirements of the system.

The output of the first pressure reducer valve is also supplied to a second pressure reducer valve, the output of which is supplied to a third pressure reducer valve, and a servo actuated selector valve. The output of the third pressure reducer valve is likewise supplied to the selector valve, and further constitutes the supply for an underspeed-overspeed governor valve. The servo actuated selector valve controls the application of either the second or third stage reduced pressure to a servo mechanism under the control of a solenoid operated valve. The servo mechanism, in turn, positions the distributor valve for effecting a change in the pitch position of the propeller blades. In addition, the servo mechanism is provided with means constituting a low pitch stop that is effective in the governed regime of propeller operation.

The output of the second pressure reducer valve is further supplied to a solenoid operated feather relay valve and a solenoid operated selector relay valve. The selector relay valve is actuated by its solenoid when operation in the negative thrust regime is selected, and is actuated by servo means when operation in the feathering regime is selected. The feather relay valve is actuated by its solenoid when operation in the feathering regime is selected. Further means are provided for energizing the electric motor-operated feathering pump whenever the requisite flow and pressure, necessary to actuate the torque unit, cannot be supplied by the direct driven pumps.

Further objects and advantages of the present invention will be apparent from the following description, reference being had to the accompanying drawing wherein a preferred embodiment of the present invention is clearly shown.

In the drawing:

The drawing is a schematic diagram of a fluid pressure system incorporating the features of the present invention.

Referring more particularly to the drawing, the fluid pressure system is utilized to control the operation of a fluid pressure actuated torque unit 1. The fluid pressure system includes a system pump 2, continuously driven during propeller rotation, which delivers hydraulic fluid under pressure from a reservoir, not shown, through a check valve 3 to a trunk line 4. The trunk line 4 is connected to the inlet of a first minimum pressure valve 5; to the inlet of a first pressure reducer valve 10; and to one side of a check valve 6. The minimum pressure valve 5 comprises a casing 7 within which is disposed a plunger 8 urged by means of a spring 9 toward one end of the casing. The valve 5 is termed a minimum pressure valve inasmuch as it will not open to interconnect trunk lines 4 and 12 until a predetermined pressure potential is attained in trunk line 4. The requisite pressure potential at which the plunger 8 will move to interconnect lines 4 and 12 is determined by the load of spring 9, which pressure potential may be on the order of 1100 p. s. i. When the pressure potential in trunk line 4 exceeds 1100 p. s. i., the pressure in trunk line 12 will be substantially the same as that in line 4. High pressure trunk line 12 is connected at opposite ends to the supply port of a distributor valve 20, and to one side of a check valve 13, which forms a part of a feathering pump control valve assembly, designated generally by 14.

The pressure reducer valve 10 comprises a casing 15 within which is disposed a plunger 16. The plunger is provided adjacent one end with a transverse opening 17 communicating with an axial bore 18 intermediate its ends. The transverse opening 17 is adapted to cooperate with an inlet port 19 that is connected to the trunk line 4. The axial bore 18 communicates with an outlet line 21 through which the first stage of reduced pressure flows. The plunger 16 is urged toward one end of the casing 15 by means of a spring 22, the load of the spring 22 determining the pressure potential existing in outlet line 21. This pressure potential may be on the order of 1100 p. s. i. Outlet line 21 of pressure reducer valve 10 is connected by means of line 23 to the inlet of a second minimum pressure valve 25. The minimum pressure valve 25 is of exactly the same design as the minimum pressure valve 5 in that it includes a plunger 24 urged toward one end of a casing by means of a spring 26. The spring 26 likewise determines the minimum pressure potential existent at an outlet port 27. This pressure may be on the order of 350 p. s. i. Outlet port 27 of minimum pressure valve 25 is connected by line 28 to a supply port of a flow valve 30. The flow valve 30 is servo actuated and controls the operation of two auxiliary pumps 31 and 32 by means to be later described.

The outlet line 21 of the first stage pressure reducer valve 10 is also connected to the inlet port of a second pressure reducer valve 40. The outlet of pressure of the second stage pressure reducer valve 40 is connected by means of lines 33 and 34 to the inlet of a third pressure reducer valve 50. As pressure reducer valves 40 and 50 are identical in design and operation with pressure reducer valve 10, a detailed description thereof is not deemed to be necessary. Suffice it to say, that the spring load of pressure reducer valve 40 effects a pressure potential on the order of 350 p. s. i. in outlet line 33, while the spring load of pressure reducer valve 50 maintains a pressure potential on the order of 100 p. s. i. in third stage outlet line 35. Outlet line 34 of the second stage of pressure reduction is also connected to a pair of ports 36 and 37 of a selector valve 60, and is further connected to inlet ports of a feather relay valve 70 and a selector relay valve 80. The feather relay valve and the selector relay valve are disposed in a common casing 71. The third stage of pressure reduction is connected by means of line 35 to a port 38 of the selector valve 60, and also connected to a supply port of an underspeed-overspeed governor valve 90.

The selector valve 60 comprises a casing 39 within which is disposed a plunger 41 that is normally urged by means of a spring 42 toward one end of the casing 39, as shown in the drawing. The plunger is provided with a plurality of lands 43, 44, 45, 46, 47 and 48. The annular channel between lands 44 and 45 is connected by means of an axial passage 49 to the annular channel between lands 47 and 48. The annular channel between lands 43 and 44 is connected by means of a port to a line 51, which communicates with an inlet port of a solenoid operated valve 100. An abutment portion 52 formed on the plunger end opposite to that upon which the spring 42 acts, limits the movement of plunger 41 to the left, as viewed in the drawing, and further provides a servo chamber 53 on one side of the land 43. Lands 45 and 46 are disposed so as to control communication between lines 54 and 55, which are connected to the control ports of the underspeed-overspeed governor valve 90 and lines 56 and 57. One end of the casing 39 is undercut at 58 and provided with a drain port 59 through which fluid may drain from axial passage 49 when the plunger 41 is moved to the right, as viewed in the drawing. The annular channel between lands 44 and 45 also communicates with a port that connects with a line 61.

Lines 56 and 57 communicate respectively with a decrease pitch port 62 and an increase pitch port 63 of the solenoid valve 100. In addition, lines 56 and 57 communicate with a decrease pitch chamber 64 and an increase pitch chamber 65 of a servo mechanism, deesignated generally by 110. The servo mechanism comprises a cylinder 66 having mounted therein a piston 67, which divides the cylinder into the chambers 64 and 65. The piston 67 is mounted for reciprocal movement within the cylinder, and is provided with oppositely extending rod portions 68 and 69. Rod portion 68 extends through one end wall of the cylinder 66 and projects through a low pitch stop cylinder 71 and a low pitch stop piston 72. The end portion of rod 68 is threaded, and a nut 73 engages the threaded portion to form an abutment or stop member. The low pitch stop cylinder 71 is connected by means of line 61 to the selector valve 60, which controls the application or drain of fluid pressure to a low pitch stop chamber 74, formed by the cylinder 71 and the piston 72. The piston 72 is provided with an axially extending flange or skirt, the function of which will be later described.

Rod portion 69 of the piston 67 extends through the other end wall of the cylinder 66 and is pivotally connected at 75 to one end of a lever 76. Intermediate its ends, the lever 76 is pivotally connected at 77 to a rod 78, which is operatively connected to a plunger 79 of the distributor valve 20. The other end of lever 76 is pivotally connected at 81 to a feedback shaft 82 actuated by the torque unit 1.

The solenoid actuated valve 100 comprises a casing 83 within which is disposed a spool valve 84 having a pair of lands which control the flow of fluid through control ports 62 and 63. Between the lands of the spool valve 84, the valve casing 83 is provided with a supply port which connects with one end of line 51. The other end of line 51 connects with a port in the selector valve casing 39 that communicates with the annular channel between lands 43 and 44. The spool valve 84 is provided with oppositely extending rod portions 86 and 87, which extend through solenoid windings 88 and 89, respectively. In addition, a pair of springs are disposed between the end walls of casing 83 and the lands on the spool valve to normally center the spool valve within the casing in the close port position. The casing is further provided with a pair of drain ports at opposite ends thereof. The solenoid windings are adapted to be alternately energized by an electronic governor, which may be of the type disclosed in co-pending application, Serial No. 253,257, filed in the name of Dinsmore, on October 26, 1951. Briefly, the governor operates to reciprocate the spool valve 84 to cause a pulsating flow through ports 62 and 63, which pulsating flow through each of the ports 62 and 63 is of the same quantity and for the same period of time when the propeller is operating at the selected speed. However, when an off-speed occurs, the quantity and time duration of the flow through ports 62 and 63, are differentiated to correct the speed error by effecting movement of the servo piston 67 and, thus, correct the off-speed. Rod portion 87 extends through the solenoid winding and through a servo piston 91, disposed within a servo cylinder 92. The rod portion 87 is provided with an abutment 93, which is disposed in the cylinder 92 on the back side of the piston 91. Between the piston 91 and the end wall of the cylinder 92, a spring 94 normally urges the piston 91 to the position it is shown in the drawing. In this position, movement of the spool valve 84 under the control of solenoid windings 88 and 89 is not affected by abutment 93 and piston 91. The servo cylinder 92 is connected by means of line 95 to a port 96, and a port 97, of the feather relay valve 70 and the selector relay valve 80, respectively.

The distributor valve 20 comprises a valve guide 20a within which is disposed plunger 79. The plunger 79 is provided with a pair of spaced lands, which control the flow of fluid through a pair of control ports that are connected by means of lines 98a and 98 to the torque unit 1. The torque unit is diagrammatically shown as comprising a cylinder 99 within which is disposed a piston 101 having oppositely extending rod portions 82 and 102. The piston 101, mounted for reciprocal movement within the cylinder 99, divides the cylinder into an increase pitch chamber 103 and a decrease pitch chamber 104.

The rod portion 102 is diagrammatically shown as provided with a rack 105, that meshes with a pinion gear 106, which, in turn, is operatively associated with a propeller blade 107. The propeller blade is shown as being rotated by a shaft 108 in the direction of the arrow. Structurally, the torque unit 1 may be of the type disclosed in the Blanchard et al. Patent 2,307,101. Increase pitch chamber 103 communicates with line 98a from the distributor valve, and decrease pitch chamber 104 communicates with line 98 from the distributor valve. Lines 98a and 98 also communicate with opposite sides of a shuttle valve 111. The shuttle valve responds to the higher of the pressures existent in the torque unit chambers 103 and 104, and connects this pressure through line 112 with a port 113 of a pressure control valve 120. The pressure control valve 120 is an equal area type valve, and comprises a casing 114 having a stepped bore 115 within which is disposed a plunger 116. One end of the plunger 116 is provided with a piston 117, which cooperates with the smaller portion of the bore 115. The other end of the plunger 116 is provided with a flange 118, which has a loose fit within the larger portion of the bore 115. The loose fit of flange 118 allows fluid to flow behind flange 118. Thus, the total areas on opposite sides of piston 117 opposed to pump output pressure through line 121 and pressure from line 112 are equal, and hence the valve is termed an equal area type valve. Disposed between a shoulder formed between stepped bore 115 and the underside of flange 118, is a spring 119. The larger portion of the bore 115 is provided with a port, which connects with a line 121, the line 121 being connected at its other end to the high pressure trunk line 12. The smaller portion of the bore 115 is provided with two ports 113 and 122. Port 122 connects by means of line 123 with a servo chamber 124 of the flow valve 30.

The equal area valve, or pressure control valve 120, determines the operating pressure of the pumps 2, 31 and 32. The valve 120 demands from the pumping system a pressure equal to that required to move the torque unit piston 101 plus a constant additional pressure sufficient to give the maximum pitch change rate. The pressure that the equal area valve demands is equal to the highest pressure existent in the torque unit plus a pressure equivalent to the load of spring 119, and a pressure equivalent to the load of centrifugal force acting on the valve plunger 116. Centrifugal force acts on all valves in the fluid system in the direction of the arrow 125. The component parts of the fluid pressure system are preferably mounted within a regulator of the type disclosed in the Blanchard et al. Patent 2,307,102, which regulator rotates with the propeller.

The underspeed-overspeed governor valve 90 comprises a valve guide 126 within which is disposed a plunger 127 having a pair of spaced lands, cooperable with a pair of spaced control ports. One end of the plunger is pivotally connected at 128 to a lever 129. The other end of the lever 129 rests on a fulcrum 130. Between the ends of the lever 129, a compression spring 131 tends to urge the lever counterclockwise about fulcrum 130, as viewed in the drawing. The plunger 127 and lever 129 will assume an equilibrium position during propeller rotation, as determined by the opposing loads of the spring 131 and centrifugal force acting in the direction of arrow 125. By reason of the lands of the plunger being of greater widths than the control ports, the valve 90 has a dead band range, which may be on the order of 30 R. P. M. The specific dead band range is variable and may be adjusted externally of the propeller by adjustment of the load of spring 131.

Due to the dead band range provided by the valve plunger 127, this valve functions as an underspeed-overspeed governor valve, while the precise governing is effected by the solenoid valve 100 under the control of an electronic governor. However, when the overspeed or underspeed limit is reached by the propeller, the valve 90 will dominate in the control of fluid flow to the end from the servo chambers 64 and 65 of the servo mechanism 110. This is so by reason of the greater port area of the valve 90 as compared to the port area of the solenoid valve 100. Movements of valve plunger 127 are limited in one direction by a ported end wall of the guide 126, and in the other direction, by a stop 132, which is adapted to contact the lever 129.

The selector relay valve 80 comprises a spool valve 133 having an extending rod portion 134 which passes through a solenoid winding 135. On one side of the spool valve 133, a servo chamber 136 is formed, which communicates with port 97 and line 95. The feather relay valve 70 comprises a spool valve 137 having an axial passage 138, which connects one side of the spool valve 137 to drain. The spool valve 137, likewise, has an extending rod portion 139, which cooperates with solenoid winding 140. As was stated before, the two valves 70 and 80 are mounted in a common casing 71 and are normally urged to the position they are shown in the drawing by means of a spring 141 disposed between the spool valves 133 and 137. The spring 141 normally urges the spool valves so that their extending rod portions 134 and 139 are in contact with stops 144 and 149, respectively.

The energization of solenoid windings 135 and 140 are controlled by a control lever 142. The lever 142 is adapted for pivotal movement, and is movable within three ranges, designated by letters N, G and F, which designate negative thrust, governing, and feathering. The position marked F is provided with a contact 143, which controls the energization of solenoid winding 140. The position marked N is provided with a contact 145, which controls the energization of the solenoid winding 135. In the position marked G, neither of the solenoid windings 135 and 140 is energized, and the electronic governor, not shown, is effective to control the reciprocating movements of the solenoid valve 100.

When the pressure and flow requirements of the torque unit 1 cannot be maintained by the pump 2, the flow valve 30 will be actuated, and connect in the auxiliary pumps 31 and 32. The flow valve comprises a casing 150 within which is disposed a plunger 151 having a pair of spaced lands, and an axial passage 152, which connects the servo chamber 124 with a chamber 153. The casing 150 is provided with a plurality of drain ports, and is also provided with a supply port 154 and a control port 155. The supply port 154 is connected by means of line 28 to the outlet port of minimum pressure valve 25. The control port 155 is connected by means of line 156 to a clutch cylinder 157. The plunger 151 is normally urged upwardly, as viewed in the drawing, by means of a spring 158 disposed within the chamber 153. However, the thrust of spring 158 is normally opposed by the pressure existing in the servo chamber 124, coming from port 122 of the pressure control valve 120. During normal operation of the system and when pump 2 is supplying the requisite flow to meet the demands of the torque unit 1, excess or surplus flow will pass through port 122 and flow through line 123 to the servo chamber 124 where it will maintain the plunger 151 in the position it is shown in the drawing. In this position, communication between ports 154 and 155 is blocked.

However, when there is no surplus flow through port 122 to chamber 124, which is indicative of the fact that pump 2 is unable to supply the flow demands of the torque unit 1, the spring 158 will urge the plunger 151 upwardly, allowing communication between ports 154 and 155. When this occurs, the minimum pressure existent in line 28 will be communicated between line 156 to servo chamber 159 of the clutch cylinder 157. Disposed within the clutch cylinder is a piston 161 having an extending rod portion 162 provided with an arcuate shoe 163. The arcuate shoe is adapted to cooperate with a driving gear 164 or clutch. The driving gear 164 normally rotates with the propeller as do pumps 31 and 32. Pumps 31 and 32 are each provided with drive gears 165 and 166, respectively, which have toothed engagement with the gear 164. When the gear 164 and the pumps 31 and 32 are all rotating, the drive gears 165 and 166 will not effect movement of the internal pump gears. However, when there is relative rotation between the gear 164 and the gears 165 and 166, the internal gears of the pumps 31 and 32 will be driven and the pumps will develop fluid under pressure. The shoe 163 is utilized to restrain rotation of the gear 164.

Thus, when fluid pressure is communicated by means of lines 28 and 156 to the servo chamber 159, the piston 161 of the clutch cylinder will move to the left, as viewed in the drawing. Movement of the piston 161 and the rod 162 to the left will effect engagement between shoe 163 and gear 164. Moreover, as long as communication between lines 28 and 156 is maintained, the fluid pressure in chamber 159 will restrain rotation of the gear 164 and thereby render the pumps 31 and 32 operative. However, as soon as the pressure and flow requirements of the system are such that an excess or surplus flow flows through line 123 to the servo chamber 124, the plunger 151 will be moved to the position shown in the drawing, and the clutch chamber 159 will be exposed to drain through the ports of the casing 150. This feature of operating the auxiliary pumps 31 and 32 only when it is necessary is extremely important in that it saves needless wear and tear on the pumps when their pressure outputs are not required. When the pumps 31 and 32 are operative, they discharge fluid under pressure through check valves 171 and 172, respectively, and through line 167, which communicates with the high pressure trunk line 12.

When the feathering regime is selected, means, not shown, are provided for effecting energization of an electric motor-operated feathering pump 180, if the direct driven system pumps are unable to supply the flow required by the torque unit 1. The feathering pump motor 180 is of three-gear type having a pair of inlets 181 and 182 and a pair of outlets 183 and 184. The outlet of the three-gear feathering pump, which is energized by the winding 185, communicates with the feathering pump control valve 14. The feathering pump control valve comprises the check valve 13 and a pressure control valve 186. The pressure control valve comprises a plunger 187 having a pair of lands and an extending rod portion 188 provided with an annular flange 189. The plunger 188 is disposed in a casing, and between an end wall of the casing and flange 189, a spring is disposed that normally tends to urge the plunger 186 downwardly, as viewed in the drawing. However, as long as the pressure in high pressure trunk line 12, which communicates with the under side of the plunger 187, is more than about 500 p. s. i., the pressure control valve will cause the feathering pump to drain through port 190. Should the pressure in trunk line 12 fall below about 500 p. s. i., the spring, acting on the flange 189, will effect movement of the plunger 187 to close the port 190 and the output of the feathering pump will pass through check valve 13 and into high pressure trunk line 12.

Operation

When the lever 142 is positioned in the governing range marked G, the feather relay valve 70, the selector relay valve 80, and the selector valve 60 are maintained in the position they are shown in the drawing. If the propeller is rotating at the precise speed selected by the lever 142, the solenoid valve 100 will oscillate or reciprocate with equal dwells at the port open positions of the spool valve 84. In this instance, equal quantities of fluid under pressure will alternately be distributed to chambers 64 and 65 of the servo mechanism 110, and the piston 67 will remain substantially stationary. With the piston 67 remaining substantially stationary, the lever 76 will not position the distributor valve plunger 79 through rod 78, and the torque unit piston 101 will remain in a fixed position, as will the blade 107.

However, should an overspeed condition occur, the electronic governor will effect differential dwells of the spool valve 84, and control port 63 will be connected to the supply port and line 51 for a greater period of time than will control port 62 during one cycle of energization of the solenoids 88 and 89. This phenomenon will cause a greater quantity of fluid under pressure to be applied to increase pitch chamber 65, and a greater drain flow from decrease pitch chamber 64. Accordingly, the piston 67 willl move to the right, as viewed in the drawing, and will pivot lever 76 in a counterclockwise direction about its pivotal connection 81 with the feedback shaft or rod 82. Movement of the lever 76 in a clockwise direction about pivot 81 will move the plunger 79 of the distributor valve to the right, as viewed in the drawing, by means of rod 78. Movement of the plunger 79 to the right will allow communication between high pressure trunk line 12 and line 98a, which communicates with the increase pitch chamber 103 of the torque unit 1.

Concurrently, with the application of fluid pressure to the chamber 103, the decrease pitch chamber 104 will be exposed to drain through line 98 and the valve guide 20a. The application of fluid pressure to chamber 103 and the connection to drain of chamber 104 will effect movement of the torque unit piston 101 to the left, as viewed in the drawing. Movement of the piston 101 to the left will effect a movement of the blade 107 to a higher pitch position through the rack 105 and the gear 106. Movement of the blade 107 to a higher pitch position will tend to correct the overspeed. Movement of piston 101 to the left will also effect movement of the feedback shaft or rod 82 and pivot lever 76 clockwise about its pivotal connection 75 with the rod 69. Movement of the lever 76 about pivot 75 in a clockwise direction will move the distributor valve plunger 79 to the left and reposition it to stop the flow of fluid to and from the torque unit 1. An electrical selsyn device 200 having a stator 201 and a rotor 202, which is mechanically connected by a linkage 203 to the gear 106 may be utilized as a remote blade angle position indicator.

If an underspeed condition should occur, the sequence of valve and piston movements will be reversed and blade 107 will be moved to a lesser pitch position to correct the underspeed error. In event that the offspeed is more than 15 R. P. M. from the selected speed, the underspeed-overspeed governor valve 90 will assist the solenoid actuated valve 100 in correcting the speed error. This phenomenon occurs when the dead band range of the plunger 127 is exceeded by the speed eror. If it is an overspeed error, the plunger 127 will move upwardly and apply fluid pressure from line 35 through lines 55 and 57 to the increase pitch chamber of the servo mechanism 110 in assisting relation to the solenoid spool valve 84. From this point on, the sequence of events is exactly as aforedescribed with respect to a slight overspeed condition. Conversely, if there is an underspeed error of greater than about 15 R. P. M., fluid pressure will be applied from the plunger 127 from line 35 through lines 54 and 56 to the decrease pitch chamber 64 of the servo mechanism 110, in assisting relation to that supplied by the solenoid actuated valve 100. In each case, when the overspeed-underspeed governor valve 90 directs fluid pressure to one or the other of the servo mechanism chambers, the other chamber will be exposed to drain through the valve guide 126.

When the lever 142 is moved to the position marked F, the solenoid winding 140 will be energized and the plunger 137 will move to the right, as viewed in the drawing, compressing spring 41. Movement of the plunger 137 to the right will allow communication between lines 34 and 95 through the port 96. The application of fluid pressure to line 95 from the line 34 will effect movement of the servo piston 91 to the left, as viewed in the drawing, and move the spool valve 84 of the solenoid actuated valve 100 to the left, as viewed in the drawing. In this instance, the effect of the solenoid windings are over-ridden by the servo mechanism, including piston 91 and cylinder 92, and the spool valve 84 is positioned to effect solid flow from line 51 through port 63 to the increase pitch chamber 65 of the servo mechanism 110. Coincidentally, with the chamber 65 being exposed to fluid pressure, the chamber 64 is connected to drain through port 62 of the solenoid actuated valve.

The existence of fluid pressure in line 95 will also be communicated to servo chamber 136 of the selector relay valve 80. The existence of pressure in servo chamber 136 will move the plunger 133 to the left, as viewed in the drawing, and allow communication between lines 34 and 191. Fluid pressure in line 191 will be transmitted to the servo 53 of the selector valve 60, and will effect movement of the selector valve plunger 41 to the right, as viewed in the drawing. Movement of the plunger 41 to the right will effect communication between port 37 and line 51. As port 37 is connected to line 34, which is the output line of the second pressure reducer valve 40, second stage reduced pressure will now be supplied to the supply port of the solenoid actuated valve 100 through the line 51.

Movement of the plunger 41 also blocks communication between lines 54 and 56 and 55 and 57 by means of lands 45 and 46. In this manner, all control by the underspeed-overspeed governor valve 90 is prevented. The application of second stage pressure to the supply port of the solenoid actuated valve will effect a higher pitch change rate by the servo mechanism 110 than is utilized in the governing range when third stage reduced pressure is supplied to the solenoid valve 100. The pitch change rate will vary substantially as the square root of the ratio between the pressure potentials remaining after friction losses through the system. The servo piston 67 will move to the right, thereby effecting movement of the distributor valve plunger to the right. The distributor valve 20 will apply fluid pressure to the torque unit 1, and move the blade 107 to the feathered position, after which the feedback mechanism, including shaft 82, will reposition the distributor valve plunger 79.

When the control lever 142 is positioned for operation in the feathering regime, the electric motor-operated feathering pump 180 will also be conditioned for operation by any suitable means, not shown. On the other hand, the feathering pump motor may be controlled by a centrifugal switch, which energizes the winding 185, whenever propeller speed is below a predetermined R. P. M. In any event, the feathering pump 180 will be operative to supply fluid pressure to trunk line 12, if it is required for moving the blade 107 to the full feathered position.

When the lever 142 is set in the position marked G for the governing regime, the low pitch stop cylinder 71 and a low pitch stop piston 72 provide means constituting a low pitch stop for the propeller blade 107. With the selector valve 60 in the position it is shown in the drawing, fluid pressure is communicated to low pitch stop chamber 74 through line 61 from line 34, and the piston 72 is maintained in the position it is shown in the drawing. With the piston 72 in this position, a stop is provided between skirt member 72a and the nut 73 that limits movement of the servo piston 67 to the left, as viewed in the drawing. By limiting movement of the servo piston 67, movement of the distributor valve plunger 79 is likewise limited, and movement of the blade 107 to a low pitch position is limited. The particular low pitch stop afforded by the low pitch stop means may be varied by adjustment of the nut 73 upon the threaded portion of the rod 68. The function of the low pitch stop is to prevent the blade 107 from turning about its longitudinal axis toward a position in which insufficient thrust will be produced to maintain the aircraft in flight. This, for example, may be on the order of 8.5°, positive pitch.

When the control lever 142 is moved to the position marked N or the negative thrust regime, the solenoid winding 135 will be energized and the selector relay valve plunger 133 will be moved to the left, as viewed in the drawing. When the plunger 133 is moved to the left, communication between lines 34 and lines 191 is afforded and the selector valve plunger 41 will be moved to the right to the position it was moved in the feathering regime. Movement of the selector valve plunger 41 to the right will expose low pitch chamber 74 to drain through line 61, axial passage 49, and port 59 of the selector valve 60. Movement of the plunger 41 will likewise effect the connection of second stage reduced pressure to the solenoid valve supply port 100. By reason of the low pitch stop cylinder being exposed to drain, the application of fluid pressure to decrease pitch chamber 64 of the servo mechanism 110 will move the low pitch piston 72 to the left and allow movement of the blade 107 into the negative thrust range.

By providing three stages of reduced pressure, namely, high-low, produced by valve 10, intermediate-low, produced by valve 40, and low-low, produced by valve 50, different pitch change rates can be realized. The pitch change rate depends on volume of flow and as the volume varies as the square root of the ratio of the effective pressures applied to the servo 110, the pitch change rate will vary likewise. Moreover, the intricate valve assemblies, which are included in the fluid pressure system, need only be subjected to relatively low pressure, thereby assuring a longer life for the seals and reducing the probability of malfunctioning of the propeller control system. Moreover, by only operating the constant delivery auxiliary pumps when their output is needed to satisfy the demand of the torque unit, needless wear and tear on the gear pump is avoided.

While the embodiment of the present invention as herein disclosed, constitutes a preferred form, it is to be understood that other forms might be adopted.

What is claimed is as follows:

1. In a variable pitch propeller having blades movable throughout a range of pitch positions, the combination including, a fluid pressure actuated torque unit operatively connected to said blades for adjusting the pitch position thereof, and a fluid pressure system for controlling the actuation of said torque unit, said system including a system source of pressure continuously operable during propeller rotation, said system source being connected to a high pressure trunk line, means connected with said trunk line for maintaining a minimum pressure therein, means connected with said trunk line for controlling the minimum pressure maintained therein, said system source normally developing excess flow which is diverted by said pressure controlling means, a distributor valve connected with said trunk line and said torque unit for directing fluid pressure to said torque unit, a normally inoperative auxiliary source of fluid under pressure connectible with said trunk line, and means connected to said pressure controlling means and operative during an absence of excess flow diverted by said pressure controlling means for rendering said auxiliary source of fluid pressure operative.

2. The combination set forth in claim 1 wherein the means for rendering said auxiliary source of fluid pressure operative includes a servo actuated valve, said valve being maintained in the closed position under the urge of said excess flow, and means associated with said valve for effecting movement thereof to an open position in the absence of said excess flow.

3. In a variable pitch propeller having blades movable throughout a range of pitch positions, the combination including, a source of fluid pressure at a high potential, fluid pressure actuated torque unit means operatively associated with said blades for adjusting the pitch position thereof, means connected with said source for deriving intermediate and low pressure potentials, a distributor valve connected with said source and said torque unit means for directing the highest of said pressure potentials to said torque unit means, servo actuated means operatively connected to the distributor valve for controlling the position of said distributor valve, and means operatively connected with said servo actuated means and connected with the intermediate and low pressure potentials for selectively controlling the application of either said low or intermediate pressure potentials to said servo actuated means whereby substantially different pitch change rates may be effected.

4. The combination set forth in claim 3 wherein the means for deriving the intermediate and low pressure potentials include a pair of pressure reducing valves connected to the source, and wherein the ratio between the intermediate pressure potential and the low pressure potential is at least 2:1 to facilitate a pitch change rate ratio of at least $\sqrt{2}:1$.

5. Means for controlling the pitch position of propeller blades, including, a fluid pressure actuated torque unit operatively associated with said blades for adjusting the pitch position thereof, a fluid pressure system for controlling the actuation of said torque unit, said system including a source of fluid pressure, a distributor valve connected with said source and said torque unit for directing fluid pressure to said torque unit, servo actuated means operatively connected with said distributor valve for controlling the position of said distributor valve, and means constituting parallel paths of flow connecting said source and said servo actuated means, one of said paths including a solenoid operated valve for precisely controlling the position of said servo actuated means, and the other of said paths including a governor valve which establishes the maximum and minimum limits of said precise control.

6. Means for controlling the pitch position of propeller blades including, a torque unit operatively associated with said blades for adjusting the pitch position thereof, a source of fluid pressure for actuating said torque unit, valve means connected to said source and said torque unit for controlling the distribution of fluid pressure to said torque unit, means connected with said source for deriving a plurality of different pressure potentials, servo actuated means operatively associated with said valve means for controlling the position thereof, means operatively associated with said servo actuated means for establishing a low pitch stop for said blades, and means operatively associated with said servo actuated means for concurrently rendering said low pitch stop means ineffective and establishing a different pitch change rate through the application of a different pressure potential to said servo actuated means.

7. The combination set forth in claim 6 wherein three different pressure potentials are derived, means applying the highest of said pressure potentials to said valve means for application to said torque unit, and wherein said means for concurrently rendering said low pitch stop means ineffective and establishing a different pitch change rate includes a selector valve in circuit connection between said pressure source and said servo actuated means for connecting either the intermediate pressure or the lowest pressure to said servo actuated means.

8. The combination set for in claim 7 wherein the means for deriving the intermediate and low pressure potentials include a pair of pressure reduced valves connected to the source, wherein the ratio of the highest pressure to the intermediate pressure is at least 2:1 and wherein the ratio of said intermediate pressure to said lowest pressure is at least 2:1.

9. In a variable pitch propeller of the type having blades adjustable in pitch within a governed speed regime, in a negative thrust regime, or a feathered regime, the combination including, a fluid pressure actuated torque unit operatively associated with said blades for adjusting the pitch position thereof, a source of fluid pressure for actuating said torque unit, a distributor valve having connection with said source and said torque unit for directing fluid pressure to said torque unit, means operatively associated with said distributor valve for effecting a low pitch stop during propeller operation in the governed speed regime, means connected with said source for deriving a plurality of different pressure potentials, means operatively associated with said distributor valve for controlling the position thereof, manual means for selecting a regime of operation other than the governed speed regime, and means operatively associated with said manual means and said low pitch stop means for rendering said low pitch stop means ineffective upon selection of the negative thrust regime.

10. The combination set forth in claim 9 wherein the means associated with said distributor valve for controlling the position thereof includes a solenoid actuated valve having connection with said source and a servo mechanism operatively connected with said distributor valve, and fluid pressure actuated means operatively connected with said solenoid valve for moving said solenoid valve independent of said solenoid energization when the feathered regime of operation is selected.

11. The combination set forth in claim 9 wherein said plurality of pressure potentials include a highest pressure, an intermediate pressure and a lowest pressure, passage means for continuously connecting said highest pressure with said distributor valve, and valve means under the control of said manual means connecting the intermediate pressure to said means controlling the position of said distributor valve during operation in the negative thrust or feathering regimes, and connecting the lowest pressure to the distributor valve positioning means when operation in the governed speed regime is selected.

12. The combination set forth in claim 11 wherein the means for deriving the intermediate and lowest pressure potentials include a pair of pressure reducing valves connected to the source and wherein the ratio of said intermediate pressure to said lowest pressure is at least 2:1, whereby the ratio of pitch change rates between the feathering and negative thrust regimes and the governing speed regime is at least $\sqrt{2}:1$.

13. The combination with a variable pitch propeller having blades adjustable in pitch within a governed speed regime, a negative thrust regime, and a feathered regime, and fluid pressure actuated means operatively connected to said blades for adjusting the pitch position of said blades of, a source of high pressure fluid for actuating the blade adjusting means, a valve operatively connected to the source and to the blade adjusting means for controlling the application of high pressure fluid to the blade adjusting means, means connected to said source for deriving intermediate and low pressure potentials, manual means for selecting the regime of propeller operation, a cylinder having disposed therein a reciprocable piston capable of fluid pressure actuation in either direction, means interconnecting said piston and said valve such that the said valve is positioned to apply high pressure fluid to the blade actuating means upon movement of the said piston, means interconnecting the blade actuating means and the said valve so as to reposition the said valve when the selected pitch adjustment of the blades has been accomplished, and valve means connected to the cylinder and to the source for applying either intermediate or low pressure fluid to the cylinder for effecting movement of said piston, said valve means being operatively associated with and actuated by operation of said manual means whereby substantially different pitch change rates may be effected.

14. The combination with a variable pitch propeller having blades adjustable in pitch within a governed speed regime, a negative thrust regime, and a feathered regime, and fluid pressure actuated means operatively connected to said blades for adjusting the pitch position of said blades of, a source of high pressure fluid for actuating the blade adjusting means, a valve operatively connected to the source and to the blade adjusting means for controlling the application of high pressure fluid to the blade adjusting means, means connected to said source for deriving intermediate and low pressure potentials, manual means for selecting the regime of propeller operation, a cylinder having disposed therein a reciprocable piston capable of fluid pressure actuation in either direction, means interconnecting said piston and said valve such that the said valve is positioned to apply high pressure fluid to the blade actuating means upon movement of the said piston, means interconnecting the blade actuating means and the said valve so as to reposition the said valve when the selected pitch adjustment of the blades has been accomplished, a movable abutment disposed in said cylinder and operatively associated with said piston for limiting movement thereof in one direction to thereby establish a low pitch stop for the blades, and valve means connected to the cylinder and said source for applying either intermediate or low pressure fluid to the cylinder for effecting movement of said piston and for applying low pressure fluid to said cylinder to position said abutment, said valve means being operatively connected to and actuated by operation of said manual means, whereby substantially different pitch change rates may be effected.

References Cited in the file of this patent

UNITED STATES PATENTS

| | | |
|---|---|---|
| 2,405,006 | Ashton | July 30, 1946 |
| 2,413,439 | Drake | Dec. 31, 1946 |
| 2,507,671 | May | May 16, 1950 |
| 2,513,660 | Martin et al. | July 4, 1950 |
| 2,526,646 | Ericson | Oct. 24, 1950 |
| 2,592,124 | Diefenderfer | Apr. 8, 1952 |
| 2,599,701 | Eames | June 10, 1952 |
| 2,626,669 | Moore et al. | Jan. 27, 1953 |

FOREIGN PATENTS

| | | |
|---|---|---|
| 600,603 | Great Britain | Apr. 14, 1948 |